United States Patent [19]
Winter et al.

[11] 3,760,068
[45] Sept. 18, 1973

[54] PRODUCTION OF FIBROUS ALKALI METAL HEXATITANATES

[75] Inventors: Gerhard Winter, Krefeld; Hans Zirngibl, Duisburg; Manfred Mansmann, Krefeld, all of Germany

[73] Assignee: Bayer Aktiengesellschaft, Leverkusen, Germany

[22] Filed: Mar. 23, 1971

[21] Appl. No.: 127,414

[30] Foreign Application Priority Data
Apr. 1, 1970 Germany.................. P 20 15 401.2

[52] U.S. Cl. ................................................ 423/598
[51] Int. Cl............................................. C01g 23/00
[58] Field of Search ......................... 23/51 R, 1 D; 423/598

[56] References Cited
UNITED STATES PATENTS
2,841,470  7/1958  Berry ................... 23/51 R
2,370,443  2/1945  Biefeld ................. 23/51 R OTHER PUBLICATIONS
Beck et al., "APC Published Application 292742," July 13, 1943.

Beck et al., "APC Published Application 393258," July 13, 1943.

*Primary Examiner*—Herbert T. Carter
*Attorney*—Burgess, Dinklage & Sprung

[57] ABSTRACT

In the manufacture of fibrous, water-insoluble alkali metal hexatitanates of the composition $Me_2Ti_6O_{13}$, wherein Me is an alkali metal except lithium by reaction of $TiO_2$ with an alkali metal compound which gives a basic reaction under the reaction conditions, the improvement which comprises effecting the reaction in a sulfate melt at a temperature up to about 1,300°C. The sulfate melt is preferably an alkali metal sulfate. The $TiO_2$ may be formed in situ by addition of some other titanium compound. The alkali metal compound preferably comprises sodium, potassium, rubidium or caesium and, expressed as the oxide, is present in about one-half to one-sixth the molar amount of the $TiO_2$.

10 Claims, No Drawings

PRODUCTION OF FIBROUS ALKALI METAL HEXATITANATES

The invention relates to a process for the manufacture of fibrous, water-insoluble alkali hexatitanates by reaction of titanium compounds with alkali compounds which give a basic reaction under the reaction conditions, in sulfate melts at temperatures of up to about 1,300°C.

Water-insoluble, fibrous alkali titanates are employed of the most diverse pruposes, for example as reinforcing agents for paper or plastics, as lubricants or as a heat insulating material. For reinforcing and insulating purposes at high temperatures, only those fibers are suitable which are chemically inert and posses a high melting point. In a strict sense, only the hexatitanates of composition $M_2O \cdot 6 TiO_2$ (= $M_2Ti_6O_{13}$) meet this requirement. Alkali titanates of higher alkali contents than that which corresponds to the above formula become chemically more active, prone to hydrolysis and more easily fusible as the alkali content increases. Thus, for example, potassium tetratitanate $K_2O \cdot 4 TiO_2$ (= $K_2Ti_4O_9$) decomposes at temperatures above 800° to give the more stable potassium hexatitanate $K_2O \cdot 6 TiO_2$, while splitting off potassium oxide (British Pat. specification 1,135,948). Whereas compounds of higher sodium content, such as for example $Na_2O \cdot 2 TiO_2$ or $Na_2O \cdot 3 TiO_2$, are hydrolyzed by water, $Na_2O \cdot 6 TiO_2$ is stable to hydrolysis (Inorg. Mater. Vol. 4, No. 1 (1969), page 81). A reinforcing material or insulating material based on alkali titanates will thus meet the highest requirements if, apart from alkali hexatitanates, it contains as far as possible no titanates richer in alkali.

A series of processes have become known for the manufacture of fibrous alkali titantes. U.S. Pat. No. 2,833,620 describes a manufacture of fibrous, water-insoluble titanates of formula $M_2O \cdot n TiO_2$ ($n = 6-7$), in which a water-soluble, basic, oxygen-containing alkali compound is reacted with an oxygen-containing titanium compound in the presence of water, at temperatures of 400°–700° and pressures of above 200 atmospheres.

German Displayed Specification No. 1,047,183 describes a process for the manufacture of fibrous, water-insoluble alkali titanates of formula $M_2O \cdot n TiO_2$, with $n = 4$ or 6, in which non-fibrous alkali titanate or titanium dioxide is dissolved in an alkali chloride or alkali fluoride melt at temperatures not exceeding 1,200°C and the fibrous alkali titanate is separated out by cooling a part of the melt. Depending on the fluoride content of the melt, tetratitanates or hexatitanates or mixtures of both are thereby produced.

Further, a process is also known (German Displayed Specification No. 1,252,654) in which, in order to manufacture alkali titanate fibers which can be employed in the insulating and reinforcing field, reaction mixtures of a basic, oxygen-containing alkali compound and an oxygen-containing titanium compound are calcined at temperatures of 975° to 1150°C, these containing up to 45 per cent by weight of alkali chloride. For complete reaction, the reaction time must be 3 to 6 hours.

In contrast, the invention relates to a process which does not require high pressure equipment for its execution, which avoids the use of easily volatile melts or reaction media, and which yields pure, fibrous alkali hexatitanates of formula $M_2Ti_6O_{13}$.

According to the invention, fibrous alkali metal hexatitanates of composition $Me_2Ti_6O_{13}$ (Me = alkali metal, especially Na, K, Rb or Cs) are manufactured by reacting $TiO_2$, added as such or formed in situ by adding titanium compounds which can be decomposed to $TiO_{65\ 2}$ under the reaction conditions, with alkali compounds which give a basic reaction under the reaction conditions, in a sulfate melt at temperatures of about 900° to 1,250°C, and separating off the alkali metal hexatitanates.

Possible compounds which can be decomposed to $TiO_2$ under the reaction conditions are, for example, $TiOSO_4$, $K_2TiO(C_2O_4)_2$ and $Ti(OH)_4$, and also compounds which form $TiO_2$ with the sulfate melt, with atmospheric moisture or with atmospheric oxygen, such as for example titanic acid esters and other titanium-organic compounds, as well as titanium halides, complex titanium halides or $TiS_2$. Alkali metal oxides, hydroxides, acetates, oxalates, thiocyanates, nitrites and nitrates can be employed as alkali compounds which give a basic reaction under the reaction conditions. Compounds of sodium, potassium, rubidium and caesium, especially of sodium and potassium, re preferred. As a sulfate melt, the alkali metal sulfates such as lithium sulfate, sodium sulfate, potassium sulfate, rubidium sulfate and caesium sulfate, individually or as a mixture, can be used for the process according to the invention, sodium sulfate and potassium sulfate being preferentially employed because of their low price.

To manufacture the fibrous alkali hexatitanates, a mixture of one or more alkali sulfates and the reaction mixture containing titanium, which can constitute up to 40 per cent, preferably up to about 25 per cent, of the total amount, is fused, kept at the reaction temperature for a time sufficient for the production of the desired fiber size, and, after cooling, is dissolved in water and filtered in order to obtain the fibrous alkali hexatitanates, the alkali hexatitanate fibers being obtained as the filter cake.

The process permits working at temperatures of up to more than about 1,300°C, but a reaction temperature of about 900°–1,250°C is completely sufficient. The choice of the working temperature and the dwell time of the melt at this temperature depends on the desired size of the alkali hexatitanate fibers. For the finest fibers, of which the diameters are 0.5 to 1 $\mu$ and the length is about ten to one hundred times the diameter, a temperature of about 900°–1,000° and a dwell time of about 1 –2 hours suffices. To manufacture alkali hexatitanate fibers with diameters of 1 to 5 $\mu$ and a length in the range of 10 to 100 times the diameter, or above, temperatures of between about 1,000° and 1,250° are employed, with a dwell time of at most about 2 hours sufficing at 1,200°C. These fibers are suitable for use in the insulating field or reinforcing field.

A further advantage of the process is that short reaction times suffice at a higher temperature. Thus, for example, fibers of approximately 1 $\mu$ diameter, with a length as much as five times to one hundred times the diameter, can be obtained by merely heating the reaction mixture to 1,250° and subsequently allowing it to cool, without having to keep the melt at this temperature.

The fibers are simply obtained by dissolving out the sulfate melt, which has cooled, by means of water. If the melt contained up to about 15 per cent of reactants, the fibers in most cases distribute themselves in the water of their own accord. If the melt contained more than about 15 per cent, the leached-out reaction product can be mechanically broken up and distributed by stirring. The fiber suspension is then filtered and washed. After filtering, a filter cake of alkali hexatitanate fibers is obtained. The X-ray diffraction diagrams always correspond to the diagram given for alkali hexatitanates (J. Inorg. Nucl. Chem. Vol. 40 [1960]236), regardless of whether the ratio of $M_2O:TiO_2$ in the reaction mixture was 1:2 or 1:6. Preferably, an $M_2O:TiO_2$ ratio of about 1:3 to 1:5 is however chosen, since such reaction mixtures are distinguished by particularly rapid reaction. The concentration of the reactants in the sulfate melt depends on the intended end use of the fibers. If value is attached to individual fibers with little felting, as is for example desired for the case of incorporation into synthetic resins, with subsequent parallel orientation of the fibers, for reinforcing purposes, it is advisable to keep the concentration of the reactants ($TiO_2$ or $TiO_2$ —source = basic alkali compound) below 15 per cent. If value is attached to more strongly felted fibers, for example for the manufacture of paper or insulating material, higher concentrations, up to about 40 per cent, and preferably up to about 25 per cent, can be employed.

The alkali hexatitanate fibers can also be manufactured through a transport reaction. For this purpose, the reaction mixture of the titanium compound and the alkali compound giving a basic reaction is introduced at one end of a boat which is kept at 1,250°. The opposite end is only kept at 900°. Transport occurs to the colder end, where the fibers can be isolated continuously. It is also possible to filter the fibers from the melt which is still liquid. In this case the reaction mixture is for example stirred into the hot melt after which, when the reaction has taken place, the fibers are sieved out by means of a platinum net. With this type of manufacture, repeated heating of the melt is saved, since the same melt can be used as often as desired.

The following experimental arrangement represents a preferred industrial embodiment. The reaction vessel used is a rectangular sheet-metal trough of 10 cm height, which is externally thermally insulated by refractory bricks. The trough is filled with alkali sulfate in such a way that an oval bed for the reaction mixture is kept free in the center. This is filled with the reaction mixture. A Pt thermocouple without protective tube is introduced into the reaction mixture and permits measuring the temperature inside the reaction material. The source of heat is a radiant furnace consisting of three adjacent SiC rods, which can be lowered from above onto the reaction trough and rests closely on the lower part. The heating surface of the radiant furnace is so chosen that only the inner part of the reaction trough directly receives radiation. The outer edge (about one third of the total surface) remains unheated. The distance between the heating rods and the surface of the reaction mixture is 3–10 cm. After switching on the current, the reaction mixture is heated to 1,200°–1,250°, at which temperature the reaction takes place. If the process is carried out at 1,250° a reaction time of 10–15 minutes suffices for complete reaction.

The reaction is carried out in such a way that when the final temperature is reached the reaction mixture is surrounded by a 2–3 cm wide strip of fused sulfate. The alkali sulfate located nearer the exterior remains unfused and hence protects the sheet-metal trough against attack by the melt. Depending on the temperature and the reaction time, the depth of the molten reaction bed is 3–5 cm. The sheet-metal trough is also protected in a downward direction from the melt by unfused alkali sulfate. Penetration of the melt to the sheet-metal wall can be prevented by appropriately little insulation, even at longer reaction times. When the reaction has taken place, the reaction trough, which is constructed on rollers, is drawn out from under the radiant furnace and replaced by a new trough. The melt on cooling forms a cake which can now simply be removed from the bed of pulverulent, unfused alkali sulfate. The bed which remains is filled with new reaction composition. After dissolving the alkali sulfate out of the melt cake, the alkali haxatitanate fibers are obtained as a woolly mass which after washing and filtering can be converted into insulating material or be employed for reinforcing synthetic resins.

The examples which follow are intended to illustrate the process of the invention in more detail, all proportions being molar unless otherwise stated.

EXAMPLE 1

$Na_2SO_4$ was heated to 980° in a platinum crucible and a reaction mixture of $Na_2CO_3$ and $TiO_2$ (1:6) was added to the melt, while stirring, the amount being 2 per cent of the melt. After stirring for 2 hours, the melt was freed of fibrous material by means of a fine platinum sieve and treated with fresh reaction mixture. It was possible to repeat this procedure several times. The filter cake which has solidified on the platinum sieve was leached with water, and filtered. The filter residue contained extremely fine small $Na_2Ti_6O_{13}$ fibers with a diameter of 0.5 to 0.8 $\mu$ and a length of 10 to 100 $\mu$

EXAMPLE 2

3.31 g of $TiOSO_4$, 4.19 g of NaSCN ($Na_2O:TiO_2$ = 1:4) and 22.5 g of $Na_2SO_4$ were mixed, so that the concentration of the reactants was 25 per cent, heated to 1,000° and kept for two hours at this temperature. After cooling, the $Na_2SO_4$ was dissolved out with water and the residue was filtered off and washed. It consisted, to the extent of 90 per cent, of fibers which could be identified as $Na_2Ti_6O_{13}$ by X-ray methods. The isometric component, amounting to 10 per cent, consisted predominantly of rutile. The $Na_2Ti_6O_{13}$ fibers had diameters of 2–3 $\mu$ and lengths of 30–400 $\mu$.

EXAMPLE 3

3.0 g of $TiO_2$, 1.90 g of $KNO_3$ and 24.7 g of $K_2SO_4$ were intimately mixed, the molar ratio of $K_2O:TiO_2$ being 1:4 and the reactants being present in the reaction mixture at a concentration of 16.6 per cent. The mixture was heated to 1,200° and kept for 2 hours at this temperature. After cooling, the solidified melt cake was dissolved in water and the fibers produced were filtered off and washed. The filter residue did not contain any isometric components, but only fibrous material, with the individual small fibers having diameters of 2–3 $\mu$ and lengths of 30–400 $\mu$ and in part also up to 1000 $\mu$. The fibers showed the X-ray diagram of potassium hexatitanate $K_2Ti_6O_{13}$.

EXAMPLE 4

3.0 g of $TiO_2$, 1.46 g of $K_2CO_3$ and 25.2 g of $K_2SO_4$ were mixed. The molar ratio of $K_2O:TiO_2$ was 1:3.55, and the concentration in the melt was 15 per cent. The mixture was heated to 1,250° over the course of 1 hour and the furnace was switched off immediately after the temperature was reached. The cooled melt was worked-up as described in Example 3. The fibers, which has been produced in almost 100 per cent yield, had diameters of about 1 $\mu$ and lengths of up to 100 $\mu$ and in individual cases up to 500 $\mu$. They were identified as $K_2Ti_6O_{13}$ by X-ray methods.

EXAMPLE 5

A 10 cm long platinum boat was charged with $Na_2SO_4$ and heated in a tubular furnace in such a way that the hot end assumed a temperature of 1,250° and the colder end a temperature of 900°. A reaction mixture of $Na_2CO_3$ and $TiO_2$, in the ratio of 1:4, was then introduced at the hot end. After a short time, $Na_2Ti_6O_{13}$ fibers began to deposit at the colder end of the boat and were continuously sieved off by means of a platinum sieve. From time to time, new reaction mixture was introduced at the hot end of the boat and the separation at the colder end was thereby maintained.

EXAMPLE 6

A rectangular sheet-metal trough of 10 cm height and a capacity of approximately 5 l, which was externally thermally insulated with chamotte bricks, was charged with 3 kg of $K_2SO_4$ in such a way as to keep free in the middle an oval bed of 2–3 cm depth. This bed was now filled with 400 g of a mixture of 41.9 g of $TiO_2$, 18.1 g of $K_2CO_3$ and 340 g of $K_2SO_4$, corresponding to a $K_2O:TiO_2$ ratio of 1:4 and a concentration of the reactants of 15 per cent. A Pt thermocouple was introduced into the middle of the reaction mixture. A radiant furnace consisting of three adjacent SiC rods, which could be lowered from above onto the reaction trough, served as the source of heat. The tight seat on the lower part was provided by asbestos strips. Excessive loss of heat by radiation or convection was thereby avoided. The heating surface of the radiant furnace corresponded in its shape to the shape of the reaction trough, but was smaller, so that only about two thirds of the surface of the reaction trough was directly irradiated. The outer edge remained unheated. The distance of the heating rods from the surface of the reaction mixture was 5 cm.

The reaction mixture was now heated to 1,250° in approximately 60 minutes and kept at this temperature for 15 minutes. After this time, the reaction mixture had completely reacted. The reaction mixture was surrounded by an approximately 2 cm wide strip of fused $K_2SO_4$. The $K_2SO_4$ located against the sheet-metal wall has not fused. The depth of the fused reaction bed was approximately 3 cm. The radiant furnace was thereafter raised and the reaction trough, which was constructed on rollers, was withdrawn laterally and replaced by a new trough. After cooling, it was possible to lift the melt cake out of the pulverulent, unfused $K_2SO_4$, replenish a little $K_2SO_4$ and fill the cavity left with fresh material to be reacted. Excess $K_2SO_4$ was removed from the melt cake by leaching-out with water, and the $K_2Ti_6O_{13}$ was obtained after washing and filtering. The filter residue consisted of woolly, felted fibers without isometric constituents. The yield was 49.1 g = 98 per cent.

It will be understood that the specification and examples are illustrative but not limitative of the present invention and that other embodiments with the spirit and scope of the invention will suggest themselves to those skilled in the art.

What is claimed is:

1. In the manufacture of fibrous, water-soluble alkali metal hexatitanates of the composition $Me_2Ti_6O_{13}$, wherein Me is an alkali metal except lithium, by reaction of $TiO_2$ with an alkali metal compound which gives a basic reaction under the reaction conditions, the improvement which comprises effecting the reaction in a melt comprising an alkali metal sulfate or a mixture of alkali metal sulfates at a temperature up to about 1,300°C., the molar ratio of the alkali metal compound, calculated as $Me_2O$, to the $TiO_2$ being about 1:2 to 1:6 and the concentration of the reactants in the sulfate melt being up to about 40 per cent by weight.

2. Process according to claim 1, wherein the reaction is carried out at a temperature of about 900°–1,250°C.

3. Process according to claim 1, wherein the sulfate melt comprises an alkali metal sulfate or a mixture of alkali metal sulfates.

4. Process according to claim 1, wherein the $TiO_2$ is formed in situ by adding at least one of titanium hydroxide, titanium nitrate, titanium sulfate, titanium halides, titanium alkoxides, titanium sulfide and a titanium-organic compound.

5. Process according to claim 1, wherein the alkali metal compound is at least one of the oxide, hydroxide, acetate, oxalate, thiocyanate, nitrite and nitrate.

6. Process according to claim 1, wherein the molar ratio of the alkali metal compound, calculated as $Me_2O$, to the $TiO_2$ is about 1:2 to 1:6.

7. Process according to claim 1, wherein the concentration of the reactants in the sulfate melt is up to about 40 per cent by weight.

8. Process according to claim 1, wherein the reaction is carried out in a vessel whose walls are protected from the melt by unfused sulfate.

9. Process according to claim 2, wherein the $TiO_2$ is added as such or is formed in situ by adding at least one of titanium hydroxide, titanium nitrate, titanium sulfate, titanium halides, titanium alkoxides, titanium sulfide and a titanium-organic compound, the alkali metal compound is at least one of the oxide, hydroxide, acetate, oxalate, thiocyanate, nitrite and nitrate, the molar ratio of the alkali metal compound to $TiO_2$ is about 1:3 to 1:5, and the concentration of the reactants in the melt is up to about 25 per cent by weight.

10. Process according to claim 1, wherein the reaction is carried out at a temperature above about 1,200°C.

* * * * *

UNITED STATES PATENT OFFICE
CERTIFICATE OF CORRECTION

Patent No. 3,760,068      Dated September 18, 1973

Inventor(s) Gerhard Winter et al

It is certified that error appears in the above-identified patent and that said Letters Patent are hereby corrected as shown below:

Col. 1, line 11, correct spelling of "purposes".

Col. 2, line 6, change "$TiO_{65\ 2}$" to -- $TiO_2$ --.

Col. 2, line 23, change " re " to -- are --.

Col. 3, line 20, change " = " to -- + --.

Col. 5, line 6, change "has" to -- had --.

Signed and sealed this 25th day of June 1974.

(SEAL)
Attest:

EDWARD M. FLETCHER, JR.
Attesting Officer

C. MARSHALL DANN
Commissioner of Patents